United States Patent
Camlibel et al.

[11] Patent Number: 5,901,264
[45] Date of Patent: May 4, 1999

[54] SOLAR RESISTANT OPTICAL FIBER AND METHOD

[75] Inventors: Irfan Camlibel, Oxford; David J. Voss, Howell; Theodore C. Rich, Berkeley Heights, all of N.J.

[73] Assignee: Fiberguide Industries, Stirling, N.J.

[21] Appl. No.: 08/873,818

[22] Filed: Jun. 12, 1997

[51] Int. Cl.⁶ .................................................. G02B 6/02
[52] U.S. Cl. .......................... 385/128; 385/141; 65/60.1
[58] Field of Search .................................. 385/123, 128, 385/126, 141; 65/60.1, 17.1, 435

[56] References Cited

U.S. PATENT DOCUMENTS 5,059,229  10/1991  Blankenship et al. ..................... 65/2
5,267,343  11/1993  Lyons et al. ............................ 385/141
5,274,734  12/1993  Jin et al. ................................ 385/142
5,621,843   4/1997  Neuberger .............................. 385/123

*Primary Examiner*—Rodney Bovernick
*Assistant Examiner*—Ellen E. Kang
*Attorney, Agent, or Firm*—Edward Dreyfus

[57] ABSTRACT

Solar resistant fused silica optical fiber is made by heating the starter rod, drawing the fiber, and preferably immediately diffusing hydrogen into the fiber, then promptly covering the hydrogen diffused fiber with hermetic coating to trap the hydrogen within the fiber. The presence of hydrogen in the fiber neutralizes UV radiation induced defects and because the hydrogen can only migrate through the fiber ends, the life of the solar resistant fiber for transmission wavelengths is increased by several years over conventional solar resistant fiber.

11 Claims, 2 Drawing Sheets

SOLAR RESISTANT OPTICAL FIBER AND METHOD

FIELD OF INVENTION

The present invention relates to optical fiber and methods of making optical fiber and more particularly to a new solar resistant optical fiber and method of making solar resistant optical fiber. The solar resistant fiber according to or produced by the present invention has a useful operating life several orders of magnitude longer than conventional solar resistant fiber made with conventional methods.

BACKGROUND

Optical fibers made with synthetic fused silica have found great many uses in military, medical, industrial and other applications primarily because fused silica has a wide transmission range from 190 nm in the ultraviolet to 2500 nm in the infrared region of the electromagnetic spectrum. It is known that various defects in the structure of the glass form both during manufacture of the bulk glass and during the fiber drawing process. Other defects result from impurities present in the glass. These defects remain in the final fiber product and cause absorption of some light in numerous wavelengths. Ultraviolet radiation, in wavelengths lower than 300 nm in particular, transmitting through the fiber is able to generate defects, commonly called e prime centers which gradually degrade transmission of the glass to such an extent that fiber becomes useless in the 190–250 nm range in a matter of days. It has been known for some time now that some of these defects can be healed by soaking fiber in a hydrogen atmosphere for 10–20 hours. Additionally, even draw induced losses appearing as an absorption band at about 630 nm in dry silica fiber, that is silica fiber with very low OH content, can be made to disappear with this process. This particular trap (defect) is of a negative charge (extra electron) and is neutralized by a proton (H+). These traps are formed in the silica matrix during fiber draw and are filled or neutralized by hydrogen diffusing into them.

The effect of UW radiation induced absorption or coloration is sometimes referred as "formation of color centers" in silica. It has been shown that if fiber or silica that has been damaged in this way is heated to a certain temperature, then the damage can be annealed out. Strong gamma rays have also been shown to eliminate this effect.

The diffusion of hydrogen into fused silica has been studied extensively. The diffusion coefficient increases with higher temperatures, as expected. In communication fibers, the presence of hydrogen is not desirable, since it causes absorption bands at communication wavelengths, degrading system transmission. Also, fibers treated in this way develop surface microcracks that can grow by a hydrolysis mechanism when fibers are under stress. See, for example, "Diffusion of Hydrogen and Deuterium in Fused Quartz", R. W. Lee, R. C. Frank, and D. E. Wests, *The Journal of Chemical Physics*, Vol. 36, No. 4, pgs. 1062–1071, Feb. 15, 1962, and "Reliability of Optical Fibers Exposed to Hydrogen: Prediction of Long-term Loss Increases", Paul J. Lemaire, *Optical Engineering*, Vol. 30, No. 6, pgs. 780–788, June 1991, incorporated herein by reference.

According to conventional thinking, therefore, it is imperative to keep hydrogen and OH (hydroxyl ion) out of communication fiber. Hermetic coatings have been developed that slow the diffusion process by orders of magnitude, in an attempt to extend the service life of the fibers.

An excess of hydrogen in the glass matrix has been known, in situ, to immediately heal UV radiation induced defects. Indeed, current methods to manufacture solarization resistant fiber involve soaking the fiber in hydrogen at some elevated temperature to create this hydrogen rich environment. However, the energy available at room temperature causes excess hydrogen to diffuse out of the fiber gradually. This causes the fiber to lose its solarization resistance in several months.

SUMMARY OF PRESENT INVENTION

The present invention recognizes that if hermetic coating of fiber prevents hydrogen diffusion into the fiber, hermetic coating will also prevent diffusion of hydrogen out of the fiber if hydrogen diffusion is applied prior to applying the hermetic coating. According to one exemplary embodiment of the present invention, hydrogen is diffused into the fiber immediately following fiber drawing and then promptly coating the fiber with an hermetic layer. With this arrangement, when during use the fiber is radiated with UV light, there will be enough hydrogen encapsulated within the fiber to heal many of the above mentioned defects generated, thereby keeping fiber transmission relatively constant and avoiding the aforementioned problems and extending the useful operating life of the fiber.

The exemplary embodiment of a method of drawing fiber includes:
1. drawing the fiber at a drawing temperature
2. diffusing hydrogen into the fiber while the fiber has residual heat from the drawing temperature
3. covering fiber with hermetic coating to encapsulate the hydrogen within the fiber
4. covering the hermetic coating with a buffer layer such as metal or plastic The only hydrogen escape would be through the ends of the fiber but this is extremely slow at room or ambient temperatures. Accordingly, the useful fiber life of this new solar resistant fiber can be 5–10 years instead of months obtained with conventionally treated fiber.

An exemplary embodiment of the intermediate fiber according to the principles of the present invention includes:
1. a drawn length of fiber having a quantity of hydrogen diffused therein when said fiber still had residual heat from being at a drawing temperature,
2. a hermetic coating covering said fiber for preventing the escape of significant portions of said quantity of hydrogen from said fiber, and
3. a buffer layer covering said hermetic coating.

DRAWINGS

Other and further advantages and benefits provided by the present invention will become apparent from the following detailed description of the exemplary embodiments when taken in view of the appended drawings, in which.

DETAILED DESCRIPTION OF PREFERRED EMBODIMENTS

Figure 1:
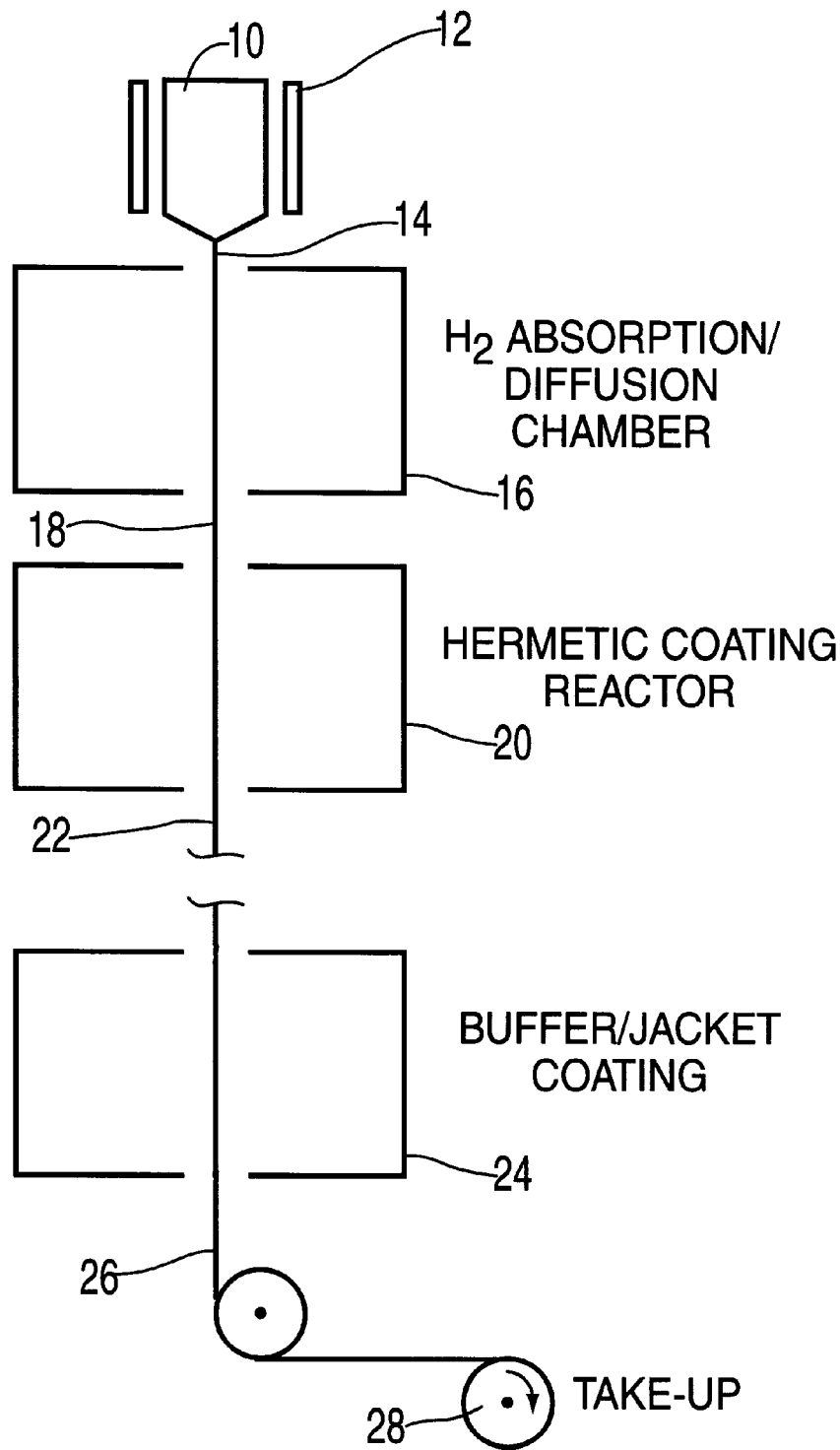
FIG. 1 is a schematic of one exemplary embodiment of the method according to the principles of the present invention.

With reference to FIG. 1, an exemplary method according to the present invention includes placing a starting glass rod 10 in a drawing chamber 12. Rod 10 can be made of fused silica or equivalent. Chamber 12 heats rod 10 to a suitable drawing temperature such as between 1900–2200 degrees Centigrade and drawing the thin optical fiber 14 from the bottom of heated rod 10. Before fiber 14 has a chance to lose all its residual heat from its drawing temperature, hydrogen is diffused into the still heated fiber 14. A hydrogen absorption or diffusion chamber 16 can be at room temperature and located a few inches beneath chamber 12 can be used to apply the hydrogen environment to the hot fiber passing through. Fiber or drawing speed may be approximately 5–40 meters per minute. The gaseous charge to chamber 16 preferably includes one or more other gasses to aid the diffusion or carrier gas process. For example, a mixture of nitrogen and hydrogen can be charged to chamber 16 preferably in ranges centered at about 15% hydrogen, 85% nitrogen. The atmosphere in chamber 16 should be slightly above one atmosphere to provide air curtain seals at the top and bottom chamber openings.

Subsequently, an hermetic coating is applied to the surface of the $H_2$ diff-used fiber 18 to encapsulate or trap within the fiber substantially all the hydrogen diffused in chamber 16. An hermetic coating reactor 20 can be used for this purpose and the coating material can be any suitable metal, metal type such as carbon (eg $C_2H_6$), aluminum, copper, boron nitride or other suitable oxides or nitrides. The hermetically sealed fiber 22 exits reactor 20 and may be treated or annealed as desired (not shown).

Subsequently, a standard metal or plastic buffer or jacket is applied in chamber 24 to the hermetically sealed, hydrogen diffused continuous fiber 22. The jacketed fiber product 26 is then fed to take up reel 28 in the usual manner.

Figure 2:
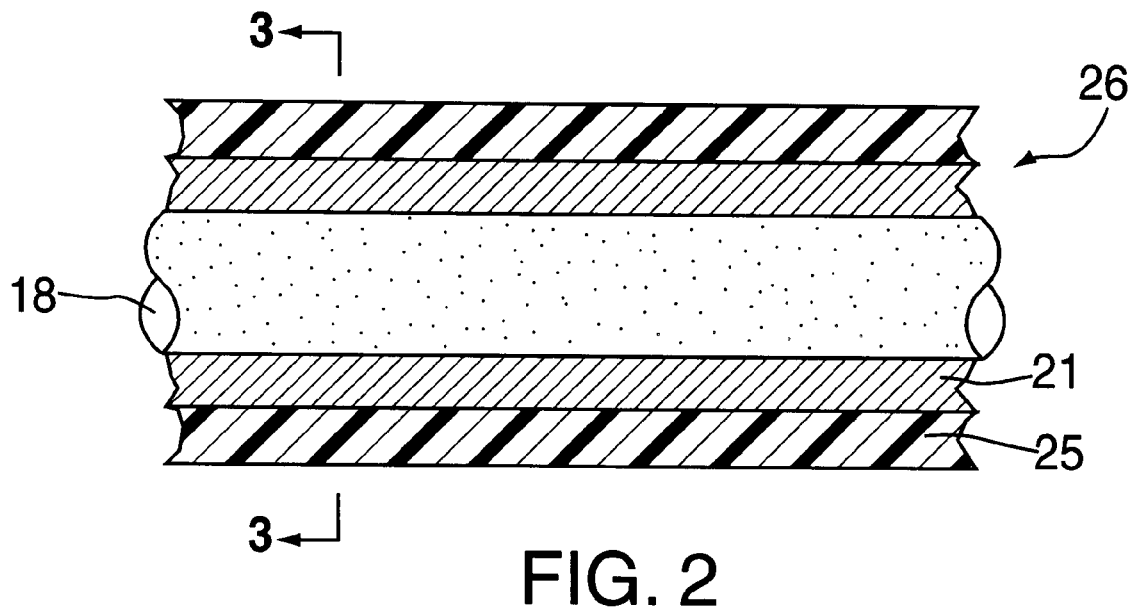
FIG. 2 is a longitudinal side section of a length of solar resistant fiber embodying the principles of the present invention.
Figure 3:
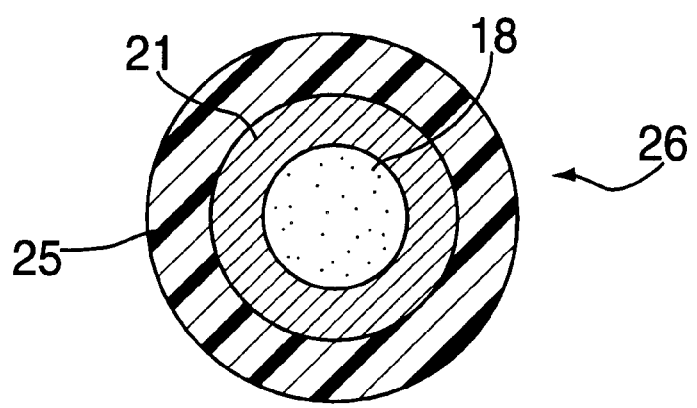
FIG. 3 is a transverse section taken along lines 3—3 of FIG. 2.

With reference to FIGS. 2 and 3, optical fiber 26 includes the hydrogen diffused fiber 18 mentioned above and seen in FIG. 1 and the hermetic coating 21 for encapsulating and preventing the escape of the diff-used hydrogen. The outer jacket or buffer layer 25 surrounds the hermetic coating 21.

Accordingly, this fiber provides particular benefits for systems operating in the UV wavelength ranges because the presence of hydrogen neutralizes the free electrons normally associated with UV transmission in optical fiber. These free electrons, if present, would absorb light and, as described above, reduce the effective operating life of the fiber.

One example of the method and product according to the principles of the present invention can include:

| Vertical Draw Tower | |
|---|---|
| Starting Rod: | |
| Material | Heraeus |
| Outside Diameter | 20 micrometers |
| Draw Speed of Fiber | meters/minute |
| Temperature fiber 14 entering chamber 16 Air curtain sealed | Approx. 600° C. |
| Chamber 16 Pressure | Slightly greater than one Atmosphere |

| Vertical Draw Tower | |
|---|---|
| Incoming gasses | 15% $H_2$ 85% $N_2$ |
| Entering incoming temperature | Room temperature |
| Chamber Height Chamber 20 | 3 or 9 inches |
| Height for carbon | 9 inches |
| Diameter of 18 | 220 micrometers |
| Thickness of 21 | 350 micrometers |
| Thickness of 25 Polyimide | 15 micrometers |

It should be understood that various modifications, and variations can be made to the embodiments disclosed herein without departing from the spirit and scope of the present invention.

We claim:

1. A method of making optical fiber for UV light transmission comprising:

heating a starter rod drawing optical fiber from the heated rod diffusing hydrogen into the fiber while the fiber still contains residual heat from said heating step, and covering the hydrogen diffused fiber with hermetic coating to encapsulate substantially all the diffused hydrogen within the fiber.

2. A method according to claim 1, wherein said diffusing step takes place within two feet of said starter rod.

3. A method according to claim 1 wherein said step includes passing the fiber through a diffusion chamber and charging the diffusion chamber with an atmosphere of gas that includes hydrogen.

4. A method according to claim 3 wherein said atmosphere also includes nitrogen.

5. A method according to claim 4 wherein said atmosphere includes less than approximately 15% hydrogen than 85% nitrogen.

6. A product made by the method of claim 1.

7. An optical fiber for UV light transmission comprising a drawn length of fiber having a quantity of hydrogen diffused therein when said fiber still had residual heat from being drawn from the heated starter rod, and a hermetic coating covering said fiber for encapsulating substantially all of said quantity of diffused hydrogen.

8. An optical fiber according to claim 7 further comprising a buffer layer located about said hermetic coating.

9. An optical fiber according to claim 7 wherein said hermetic coating is one of a group consisting of carbon, aluminum, copper, and boron nitride.

10. An optical fiber according to claim 7 wherein said hermetic coating is one of a group consisting of oxides and nitrides.

11. An optical fiber according to claim 7 wherein said drawn fiber is made of fused silica.

* * * * *